United States Patent
Ma et al.

(10) Patent No.: US 12,453,315 B2
(45) Date of Patent: Oct. 28, 2025

(54) SHEARING MECHANISM AND GARDEN SHEAR

(71) Applicant: Zhongshan Green Guard Metal Production Co., Ltd., Guangdong (CN)

(72) Inventors: Mike Ma, Guangdong (CN); Jiachang Xu, Guangdong (CN)

(73) Assignee: Zhongshan Green Guard Metal Production Co., Ltd., Guangdong (CN)

( * ) Notice: Subject to any disclaimer, the term of this patent is extended or adjusted under 35 U.S.C. 154(b) by 306 days.

(21) Appl. No.: 18/119,061

(22) Filed: Mar. 8, 2023

(65) Prior Publication Data

US 2024/0107951 A1 Apr. 4, 2024

(30) Foreign Application Priority Data

Sep. 30, 2022 (CN) .......................... 202211206641.3

(51) Int. Cl.
*A01G 3/047* (2006.01)

(52) U.S. Cl.
CPC .................................. *A01G 3/0475* (2013.01)

(58) Field of Classification Search
CPC . A01G 3/06; A01G 3/065; A01G 3/08; A01G 3/081; A01G 3/083; A01G 3/0251; A01G 3/0475; A01G 3/02; A01G 3/021; B26B 13/26; B26B 13/28; B26B 17/02
USPC .................................................. 30/252, 254
See application file for complete search history.

(56) References Cited

U.S. PATENT DOCUMENTS

| | | | | |
|---|---|---|---|---|
| 476,459 | A * | 6/1892 | Hamann | B26B 13/26 30/252 |
| 6,662,451 | B1 * | 12/2003 | Cheng | A01G 3/0475 30/177 |
| 6,789,324 | B2 * | 9/2004 | Linden | B26B 13/26 30/341 |
| 6,829,829 | B1 * | 12/2004 | Huang | A01G 3/0475 30/252 |
| D621,234 | S * | 8/2010 | Goetz | D8/5 |
| 8,136,252 | B2 * | 3/2012 | Linden | B25B 7/12 30/341 |

(Continued)

FOREIGN PATENT DOCUMENTS

| | | | |
|---|---|---|---|
| CN | 2930263 Y | * | 8/2007 |
| CN | 106342565 A | * | 1/2017 |

(Continued)

*Primary Examiner* — Laura M Lee
(74) *Attorney, Agent, or Firm* — Hayes Soloway P.C.

(57) ABSTRACT

A shearing mechanism may include a mounting bracket, a first shearing assembly, a second shearing assembly and a linkage mechanism. The first shearing assembly may include a first actuating arm rotatably arranged on the mounting bracket and a first shearing portion rotatably arranged on the mounting bracket. The first actuating arm is provided with a first driving gear, and the first shearing portion is provided with a first driven gear engaged with the first driving gear. The second shearing assembly may include a second actuating arm rotatably arranged on the mounting bracket and a second shearing portion rotatably arranged on the mounting bracket. The second actuating arm is provided with a second driving gear, and the second shearing portion is provided with a second driven gear engaged with the second driving gear. A garden shear may include the shearing mechanism.

5 Claims, 5 Drawing Sheets

(56) References Cited

U.S. PATENT DOCUMENTS

2010/0162575 A1\* 7/2010 Lin .................. A01G 3/0251
30/245
2013/0152404 A1\* 6/2013 Huang ................ B26B 13/26
30/250

FOREIGN PATENT DOCUMENTS

| CN | 107466688 A | \* | 12/2017 | |
|----|-------------|---|---------|---|
| CN | 210053945 U | | 2/2020 | |
| CN | 116235713 A | \* | 6/2023 | |
| CN | 116508520 A | \* | 8/2023 | |
| CN | 117502009 A | \* | 2/2024 | |
| DE | 102004062521 A1 | \* | 7/2006 | ........... A01G 3/0251 |
| EP | 1010364 A2 | \* | 6/2000 | ........... A01G 3/0251 |
| GB | 2390321 A | \* | 1/2004 | ........... A01G 3/0475 |
| GB | 2483663 A | \* | 3/2012 | ........... A01G 3/0251 |

\* cited by examiner

SHEARING MECHANISM AND GARDEN SHEAR

CROSS-REFERENCE TO RELATED APPLICATIONS

The present disclosure claims priority to and the benefit of Chinese Patent Application No. 202211206641.3 filed Sep. 30, 2022, the contents of which are incorporated herein by reference.

TECHNICAL FIELD

The present disclosure relates to the field of garden tools, and in particular to a shearing mechanism and a garden shear.

BACKGROUND

For traditional garden shears, a shearing portion is directly connected to a handle in general, and the opening and closing of a shearing mechanism can be controlled by opening and closing the handle. Such above structure is simple, and its manufacturing cost is low, but it has no effect of labor saving. For this purpose, at present, some garden shears use a connecting rod mechanism or a connecting rod-sliding block mechanism to achieve the effect of labor saving. For example, in a Chinese patent, named as "linkage labor-saving mechanism for garden shear" with a patent number of CN201920234270.7, a structure with a plurality of connecting rods and sliding pairs is used for achieving a labor-saving shearing effect. However, the structure is complex and the connection relationship is complicated, which is not conducive to production and assembly.

SUMMARY

The present disclosure aims at solving at least one of the technical problems in the prior art. For this purpose, the present disclosure provides a shearing mechanism, which has an advantage of simple structure.

The present disclosure further provides a garden shear.

According to an embodiment of a first aspect of the present disclosure, a shearing mechanism is provided, and the shearing mechanism may include a mounting bracket, a first shearing assembly, a second shearing assembly and a linkage mechanism; wherein the first shearing assembly may include a first actuating arm rotatably arranged on the mounting bracket and a first shearing portion rotatably arranged on the mounting bracket, the first actuating arm is provided with a first driving gear, and the first shearing portion is provided with a first driven gear engaged with the first driving gear; the second shearing assembly may include a second actuating arm rotatably arranged on the mounting bracket and a second shearing portion rotatably arranged on the mounting bracket, the second actuating arm is provided with a second driving gear, and the second shearing portion is provided with a second driven gear engaged with the second driving gear; wherein the linkage mechanism is arranged between the first actuating arm and the second actuating arm, resulting in that the first actuating arm and the second actuating arm can synchronously rotate relative to the mounting bracket in a reverse direction; or, the linkage mechanism is arranged between the first shearing portion and the second shearing portion, resulting in that the first shearing portion and the second shearing portion can synchronously rotate relative to the mounting bracket in a reverse direction.

According to the embodiment of the present disclosure, the shearing mechanism at least provides the following beneficial effects: by adopting a transmission structure with gear-tooth matching, different gear ratios can be configured according to the requirements, so as to save labor or control the size of a shearing opening. The transmission structure is simple, is easy to be manufactured, and can be arranged in a smaller installation space. In this way, the structure can be arranged more compact and reasonable.

Through the linkage mechanism, the first shearing assembly and the second shearing assembly can be linked relatively, which is convenient for shearing control of the shearing mechanism.

In some embodiments of the present disclosure, the linkage mechanism may include a sliding member slidably arranged on the mounting bracket, and the first shearing portion and the second shearing portion are respectively provided with a sliding structure matched with the sliding member in a sliding manner, so as to realize the linkage of the first shearing portion and the second shearing portion.

In some embodiments of the present disclosure, the sliding member is a sliding pin, the mounting bracket is provided with a guiding slot matched with the sliding pin in a sliding manner, and the first shearing portion and the second shearing portion are respectively provided with a linkage slot matched with the sliding pin in a sliding manner, so as to realize the match among the sliding pin, the mounting bracket, the first shearing portion and the second shearing portion for linkage.

In some embodiments of the present disclosure, the mounting bracket may include an upper mounting plate and a lower mounting plate, one end of the upper mounting plate is connected to one end of the lower mounting plate via a first connecting shaft pin, the other end of the upper mounting plate is connected to the other end of the lower mounting plate via a second connecting shaft pin, the first actuating arm and the second actuating arm are arranged between the upper mounting plate and the lower mounting plate and are rotatably matched with the first connecting shaft pin, and the first shearing portion and the second shearing portion are arranged between the upper mounting plate and the lower mounting plate and are rotatably matched with the second connecting shaft pin.

In some embodiments of the present disclosure, both the upper mounting plate and the lower mounting plate are provided with the guiding slot, both ends of the sliding pin are guiding heads respectively, a middle part of the sliding pin is a linkage portion, the guiding head has a diameter greater than that of the linkage portion, and the sliding pin is arranged between the upper mounting plate and the lower mounting plate, the guiding heads are respectively and correspondingly matched with both guiding slots of the upper mounting plate and the lower mounting plate in a sliding manner, and the linkage portion passes through both linkage slots of the first shear portion and the second shear portion, and the linkage portion is matched with the linkage slots in a sliding manner. With a structure of the sliding pin having two small ends and a large middle part, the slidable installation position of the sliding pin can be directly located during the assembly of the mounting bracket, so as to form a rotatable matching with the first shearing portion and the second shearing portion. The corresponding structure is simple and reasonable, and the corresponding assembly is convenient.

In some embodiments of the present disclosure, the first connecting shaft pin is connected to a nut by passing through the upper mounting plate, the first actuating arm, the second actuating arm and the lower mounting plate in turn, such that the mechanism assembly at the first connecting shaft pin is completed.

In some embodiments of the present disclosure, the second connecting shaft pin is connected to the nut by passing through the upper mounting plate, the first shearing portion, the second shearing portion and the lower mounting plate in turn, such that the mechanism assembly at the second connecting shaft pin is completed.

According to an embodiment of a second aspect of the present disclosure, a garden scissor is provided, and the garden shear may include the shearing mechanism according to any one of the embodiments of the first aspect of the present disclosure, and the garden shear is provided with two handles connected to the first actuating arm and the second actuating arm respectively.

According to the embodiment of the present disclosure, the garden shear at least has the following beneficial effects: the garden shear can meet the requirements of horticulture shearing and have a simple and reasonable structure.

BRIEF DESCRIPTION OF THE DRAWINGS

The above and/or additional aspects and advantages of the present disclosure will be more apparent from the following description of the embodiments in conjunction with the accompanying drawings, wherein.

REFERENCE NUMERALS first shearing assembly 100, linkage slot 101, first actuating arm 110, first driving gear 111, first shearing portion 120, first driven gear 121;

first shearing assembly 200, first actuating arm 210, first driving gear 211, first shearing portion 220, first driven gear 221;

mounting bracket 900, guiding slot 901, sliding pin 910, guiding head 911, linkage portion 912, upper mounting plate 960, lower mounting plate 920, first connecting shaft pin 930, second connecting shaft pin 940, and nut 950.

DETAILED DESCRIPTION

The embodiments of the present disclosure will be described in detail hereinafter. Examples of the embodiments are shown in the accompanying drawings. The same or similar reference numerals throughout the drawings denote the same or similar elements or elements having the same or similar functions. The embodiments described below with reference to the accompanying drawings are exemplary and are only intended to explain the present disclosure, but should not be construed as limiting the present disclosure.

In the description of the present disclosure, it should be understood that the orientation or position relation related to the orientation description, such as the orientation or position relation indicated by the upper, lower, front, rear, left, right, etc., is based on the orientation or position relation shown in the drawings, which is only used for convenience of description of the present disclosure and simplification of description instead of indicating or implying that the indicated device or element must have a specific orientation, and be constructed and operated in a specific orientation, and thus the orientation description shall not be understood as a limitation to the present disclosure.

In the description of the present disclosure, if "first" and "second" are described, the descriptions are used for the purpose of distinguishing the technical features only, and cannot be understood as indicating or implying relative importance, or implicitly indicating the number of technical features indicated thereby, or implicitly indicating the order of technical features indicated thereby.

In the description of the present disclosure, unless otherwise clearly defined, words such as setting, installation, connection, and the like, shall be understood broadly, and those skilled in the art can reasonably determine the specific meanings of the above words in the present disclosure in combination with the specific contents of the technical solution.

Figure 1:
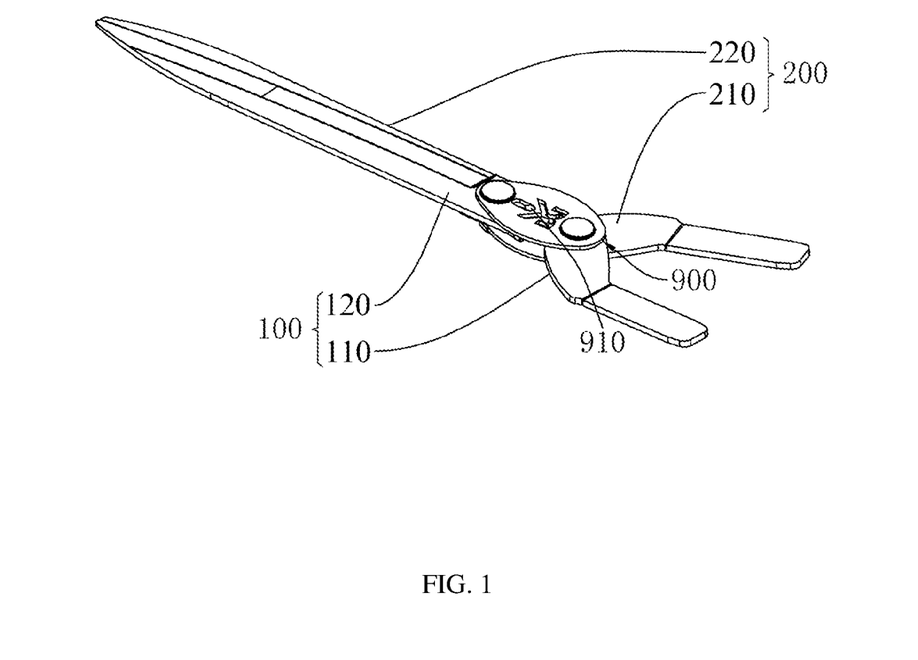
FIG. 1 is a structural schematic diagram of a shearing mechanism of the embodiment of the present disclosure.
Figure 2:
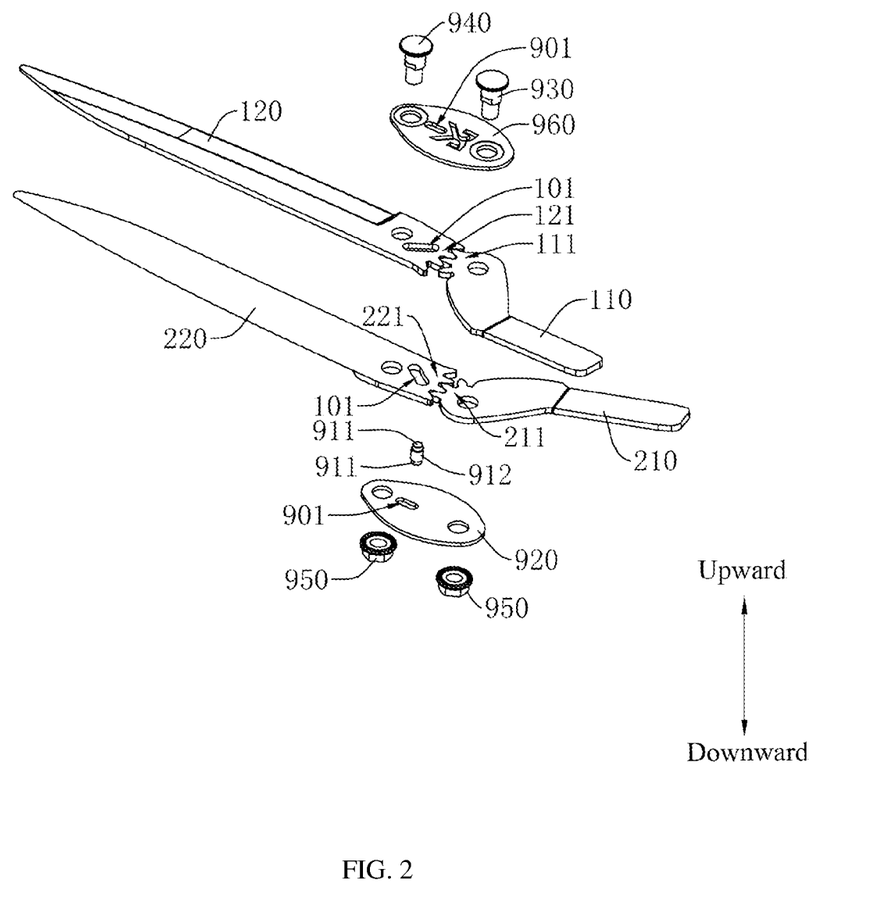
FIG. 2 is a exploded schematic diagram of the shearing mechanism of the embodiment of the present disclosure.
Figure 5:
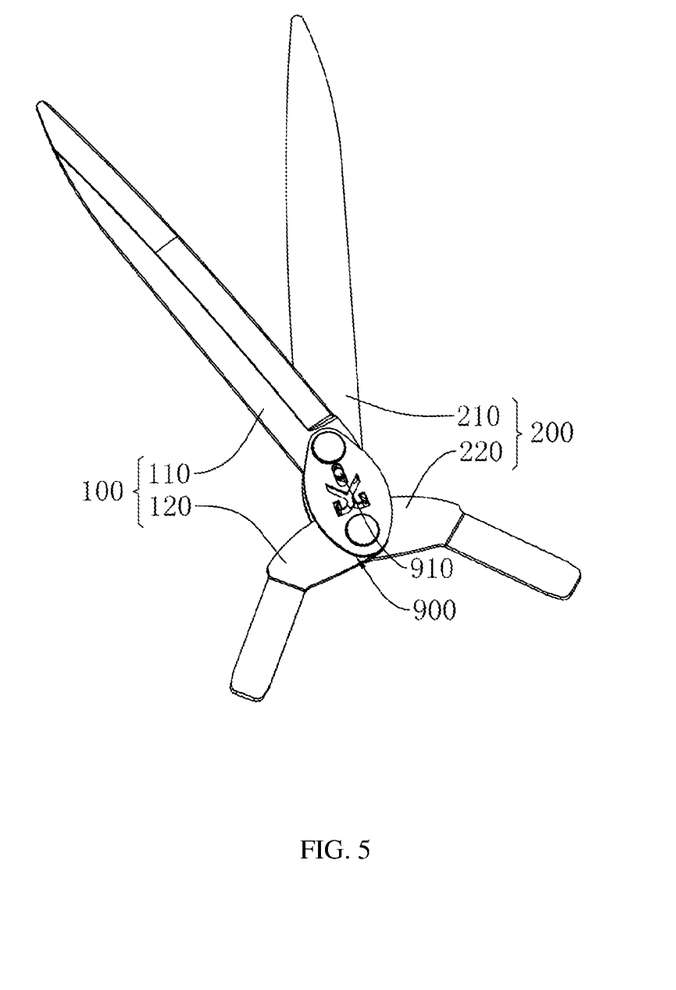
FIG. 5 is a structural schematic diagram of the shearing mechanism of the embodiment of the present disclosure when opening.

As shown in FIG. 1, FIG. 2 and FIG. 5, according to the embodiments of the present disclosure, the shearing mechanism includes a mounting bracket 900, a first shearing assembly 100, a second shearing assembly 200 and a linkage mechanism; the first shearing assembly 100 includes a first actuating arm 110 rotatably arranged on the mounting bracket 900 and a first shearing portion 120 rotatably arranged on the mounting bracket 900, the first actuating arm 110 is provided with a first driving gear 111, and the first shearing portion 120 is provided with a first driven gear 121 engaged with the first driving gear 111; the second shearing assembly 200 includes a second actuating arm 210 rotatably arranged on the mounting bracket 900 and a second shearing portion 220 rotatably arranged on the mounting bracket 900, the second actuating arm 210 is provided with a second driving gear 211, and the second shearing portion 220 is provided with a second driven gear 221 engaged with the second driving gear 211; wherein the linkage mechanism is arranged between the first actuating arm 110 and the second actuating arm 210, resulting in that the first actuating arm 110 and the second actuating arm 210 can synchronously rotate relative to the mounting bracket 900 in a reverse direction; or, the linkage mechanism is arranged between the first shearing portion 120 and the second shearing portion 220, resulting in that the first shearing portion 120 and the second shearing portion 220 can synchronously rotate relative to the mounting bracket 900 in a reverse direction.

By adopting a transmission structure with gear-tooth matching, different gear ratios can be configured according to the requirements, so as to save labor or control the size of a shearing opening. The transmission structure is simple, is easy to be manufactured, and can be arranged in a smaller installation space. In this way, the structure can be arranged more compact and reasonable.

In some embodiments of the present disclosure, through the linkage mechanism, the first shearing assembly 100 and the second shearing assembly 200 can be linked relatively, which is convenient for shearing control of the shearing mechanism.

In some embodiments of the present disclosure, by configuring the linkage mechanism, problems such as shearing deviation, control trouble and the like can be eliminated in the shearing process of the shearing mechanism, and the shearing mechanism using gear-tooth transmission can be conveniently applied to actual shearing tools, such as garden shears, rose scissors, tree pruners and other garden tools.

Figure 3:
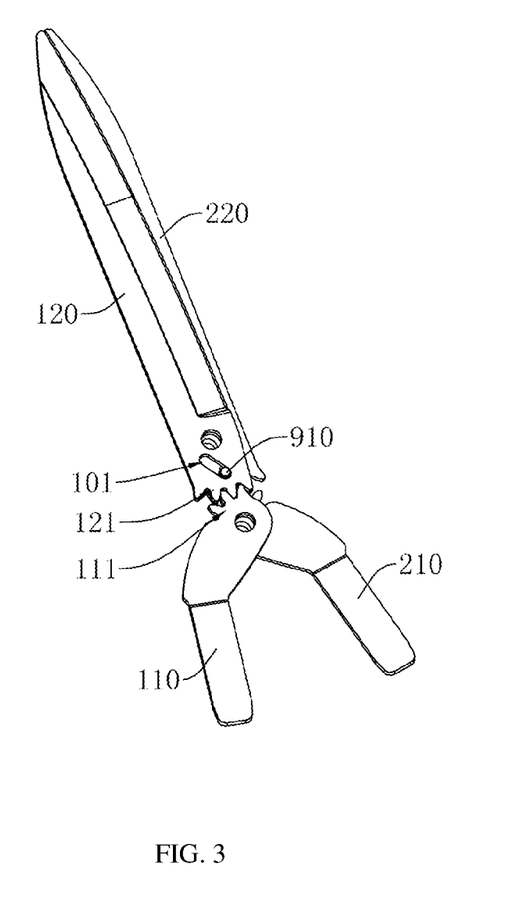
FIG. 3 is an internal structural schematic diagram of the shearing mechanism of the embodiment of the present disclosure when closing.
Figure 4:
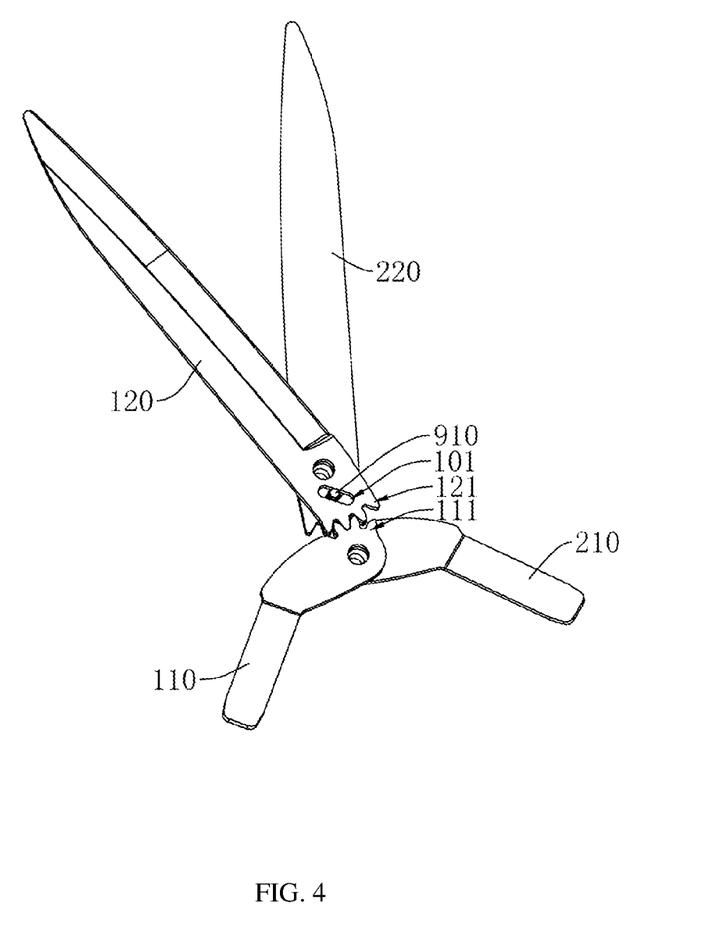
FIG. 4 is an internal structural schematic diagram of the shearing mechanism of the embodiment of the present disclosure when opening.

In some embodiments of the present disclosure, as shown in FIG. 3 and FIG. 4, the first actuating arm 110 and the first shearing portion 120 are distributed on the same side, and the second shearing portion 220 and the second actuating arm 210 are distributed on the same side. When the first actuating arm 110 and the second actuating arm 210 are opened relative to each other, the first actuating arm 110 rotates clockwise and the second actuating arm 210 rotates counterclockwise, due to a driven by the gear-tooth matching, the first shearing portion 120 rotates counterclockwise and the second shearing portion 220 rotates clockwise, so as to realize the shearing action.

In some embodiments of the present disclosure, the linkage mechanism includes a sliding member slidably arranged on the mounting bracket 900, and the first shearing portion 120 and the second shearing portion 220 are respectively provided with a sliding structure matched with the sliding member in a sliding manner, so as to realize the linkage of the first shearing portion 120 and the second shearing portion 220.

In some embodiments of the present disclosure, the mounting bracket 900 limits the sliding movement of the sliding member. When the first shearing portion 120 moves, the sliding member acts on the first shearing portion 120 and the mounting bracket 900 respectively, resulting in that the first shearing portion 120 rotates relative to the mounting bracket 900 under the action of the linkage mechanism. Similarly, the second shearing portion 220 rotates relative to the mounting bracket 900 under the action of the linkage mechanism, and thus realizing the linkage between the first shearing portion 120 and the second shearing portion 220.

It can be noted that the linkage mechanism can also be arranged between the first actuating arm 110 and the actuating drive arm 210. For example, the first actuating arm 110 and the second actuating arm 210 are respectively provided with gear parts engaged with each other, which also resulting in that the first actuating arm 110 and the second actuating arm 210 are relatively linked.

As shown in FIG. 2, FIG. 3 and FIG. 4, in some embodiments of the present disclosure, the sliding member is a sliding pin 910, the mounting bracket 900 is provided with a guiding slot 901 matched with the sliding pin 910 in a sliding manner, and the first shearing portion 120 and the second shearing portion 220 are respectively provided with a linkage slot 101 matched with the sliding pin 910 in a sliding manner, so as to realize the match among the sliding pin 910, the mounting bracket 900, the first shearing portion 120 and the second shearing portion for linkage 220.

In some embodiments of the present disclosure, the linkage slot 101 of the first shearing portion 120 and the linkage slot 101 of the second shearing portion 220 are symmetrical to each other and are distributed in a crossed shape to achieve the reverse linkage function.

Of course, in the specific implementation process, the sliding member can also be a sliding block arranged on the mounting bracket 900. For example, the mounting bracket 900 is in a flat plate structure, and two interconnected sliding blocks are arranged above and below the mounting bracket 900 via sliding rails in a sliding manner. The two interconnected sliding blocks are respectively matched with the first shearing portion 120 and the second shearing portion 220 in a sliding manner, which can also achieve the linkage function.

As shown in FIG. 2, in some embodiments of the present disclosure, the mounting bracket 900 includes an upper mounting plate 960 and a lower mounting plate 920, one end of the upper mounting plate 960 is connected to one end of the lower mounting plate 920 via a first connecting shaft pin 930, the other end of the upper mounting plate 960 is connected to the other end of the lower mounting plate 920 via a second connecting shaft pin 940, the first actuating arm 110 and the second actuating arm 210 are arranged between the upper mounting plate 960 and the lower mounting plate 920 and are rotatably matched with the first connecting shaft pin 930, and the first shearing portion 120 and the second shearing portion 220 are arranged between the upper mounting plate 960 and the lower mounting plate 920 and are rotatably matched with the second connecting shaft pin 940.

Through the above structure, the first actuating arm 110 shares a rotating shaft with the second actuating arm 210, the first shearing segment 120 shares a rotating shaft with the second shearing segment 220, and thus the first actuating arm 110, the first shearing segment 120 and the mounting bracket 900 form a rotatable connection structure, and the shearing mechanism is relatively simple and reasonable.

It can be noted that the mounting bracket 900 can also be in a single panel structure or an integrated frame structure, which can also meet the installation requirements.

It can be noted that in some embodiments of the present disclosure, the first actuating arm 110 and the second actuating arm 210 can be connected to different rotating shafts. Similarly, the first shearing segment 120 and the second shearing segment 220 can be connected to different rotating shafts, which can also achieve the function of the shearing mechanism.

As shown in FIG. 2, in some embodiments of the present disclosure, both the upper mounting plate 960 and the lower mounting plate 920 are provided with the guiding slot 901, both ends of the sliding pin 910 are guiding heads 911 respectively, the middle part of the sliding pin 910 is a linkage portion 912, the diameter of the guiding head 911 is greater than the diameter of the linkage portion 912, and the sliding pin 910 is arranged between the upper mounting plate 960 and the lower mounting plate 920, the two guiding heads 911 are respectively and correspondingly matched with both guiding slots 901 of the upper mounting plate 960 and the lower mounting plate 920 in a sliding manner, and the linkage portion 912 passes through both linkage slots 101 of the first shear portion 120 and the second shear portion 220, and the linkage portion 912 is matched with the linkage slots 101 in a sliding manner. With a structure of the sliding pin 910 having two small ends and a large middle part, the slidable installation position of the sliding pin 910 can be directly located during the assembly of the mounting bracket 900, so as to form a rotatable matching with the first shearing portion 120 and the second shearing portion 220. The corresponding structure is simple and reasonable, and the corresponding assembly is convenient.

It can be noted that, in some embodiments of the disclosure, the sliding pin 910 can also be arranged as a long cylinder with an equal diameter, and then stop screws are arranged at both ends of the sliding pin 910. The sliding pin 910 can also be installed into the upper mounting plate 960, the first shearing portion 120, the second shearing portion 220 and the lower mounting plate 920, and is fixed by the stop screws.

As shown in FIG. 2, in some embodiments of the present disclosure, the first connecting shaft pin 930 is connected to a nut 950 by passing through the upper mounting plate 960, the first actuating arm 110, the second actuating arm 210 and the lower mounting plate 920 in turn, such that the mechanism assembly at the second connecting shaft pin is completed.

As shown in FIG. 2, in some embodiments of the present disclosure, the second connecting shaft pin 940 is connected to the nut 950 by passing through the upper mounting plate 960, the first shearing portion 120, the second shearing portion 220 and the lower mounting plate 920 in turn, such that the mechanism assembly at the second connecting shaft pin 940 is completed.

It can be noted that the first connecting shaft pin 930 and the second connecting shaft pin 940 can also form a fixed connection with the mounting bracket 900 by riveting, welding, etc. According to an embodiment of a second aspect of the present disclosure, the garden shear includes the shearing mechanism according to any one of the embodiments of the first aspect of the present disclosure, and the garden shear is provided with two handles connected to the first actuating arm 110 and the second actuating arm 210 respectively, which can meet the requirements of garden shearing and have a simple and reasonable structure.

Of course, the creation of the present disclosure is not limited to the above embodiments, and those skilled in the art can also make equivalent deformation or replacement without violating the scope of the present disclosure. These equivalent deformations or replacements are all included in the scope as defined by the claims of the present disclosure.

The invention claimed is:

1. A shearing mechanism, comprising:
    a mounting bracket;
    a first shearing assembly, wherein the first shearing assembly comprises a first actuating arm rotatably arranged on the mounting bracket and a first shearing portion rotatably arranged on the mounting bracket, wherein the first actuating arm is provided with a first driving gear, and the first shearing portion is provided with a first driven gear engaged with the first driving gear;
    a second shearing assembly, wherein the second shearing assembly comprises a second actuating arm rotatably arranged on the mounting bracket and a second shearing portion rotatably arranged on the mounting bracket, wherein the second actuating arm is provided with a second driving gear, and the second shearing portion is provided with a second driven gear engaged with the second driving gear; and
    a linkage mechanism;
    wherein the linkage mechanism is arranged between the first actuating arm and the second actuating arm, wherein the first actuating arm and the second actuating arm are capable of rotating synchronously relative to each other in opposite directions;
    or,
    wherein the linkage mechanism is arranged between the first shearing portion and the second shearing portion, wherein the first shearing portion and the second shearing portion are capable of rotating synchronously relative to each other in opposite directions;
    wherein the linkage mechanism comprises a sliding pin slidably arranged on the mounting bracket, wherein the first shearing portion and the second shearing portion are respectively provided with a linkage slot matched with the sliding pin in a sliding manner;
    the mounting bracket comprises an upper mounting plate and a lower mounting plate, wherein one end of the upper mounting plate is connected to one end of the lower mounting plate via a first connecting shaft pin, wherein the other end of the upper mounting plate is connected to the other end of the lower mounting plate via a second connecting shaft pin;
    the first actuating arm and the second actuating arm are arranged between the upper mounting plate and the lower mounting plate and are rotatably matched with the first connecting shaft pin;
    the first shearing portion and the second shearing portion are arranged between the upper mounting plate and the lower mounting plate and are rotatably matched with the second connecting shaft pin; and
    the upper mounting plate is provided with a first guiding slot, the lower mounting plate is provided with a second guiding slot, both the first guiding slot and the second guiding slot are matched with the sliding pin in a sliding manner.

2. The shearing mechanism according to claim 1, wherein:
    both ends of the sliding pin are guiding heads respectively, wherein a middle part of the sliding pin is a linkage portion, wherein the guiding head has a diameter greater than that of the linkage portion, and wherein the sliding pin is arranged between the upper mounting plate and the lower mounting plate, wherein the guiding heads are respectively and correspondingly matched with both the first guiding slot of the upper mounting plate and the second guiding slot of the lower mounting plate in a sliding manner, and wherein the linkage portion passes through both linkage slots of the first shear portion and the second shear portion, and wherein the linkage portion is matched with the linkage slots in a sliding manner.

3. The shearing mechanism according to claim 1, wherein:
    the first connecting shaft pin is connected to a nut by passing through the upper mounting plate, the first shearing portion, the second shearing portion and the lower mounting plate in turn.

4. The shearing mechanism according to claim 1, wherein:
    the second connecting shaft pin is connected to the nut by passing through the upper mounting plate, the first actuating arm, the second actuating arm and the lower mounting plate in turn.

5. A garden shear, comprising the shearing mechanism according to claim 1.

* * * * *